United States Patent [19]

Denk

[11] 4,331,070

[45] May 25, 1982

[54] APPARATUS FOR HEATING LIQUIDS, IN PARTICULAR FOODSTUFFS AND LUXURY FOODSTUFFS, FOR THE PURPOSE OF PASTEURIZATION, STERILIZATION AND THE LIKE

[76] Inventor: Viktor Denk, Buchenstrasse 12, 8051 Kranzberg, Fed. Rep. of Germany

[21] Appl. No.: 150,258

[22] Filed: May 15, 1980

[51] Int. Cl.³ ............................................... A23C 3/02
[52] U.S. Cl. ........................................ 99/483; 99/464
[58] Field of Search ................. 99/483, 452, 453, 460, 99/462, 464

[56] References Cited

U.S. PATENT DOCUMENTS

| | | | |
|---|---|---|---|
| 1,428,602 | 9/1922 | Malekow | 99/453 X |
| 1,885,626 | 11/1932 | Quaedvlieg | 99/462 |
| 3,586,510 | 6/1971 | Farkas | 99/483 |

Primary Examiner—Edward J. McCarthy
Attorney, Agent, or Firm—Blanchard, Flynn, Thiel, Boutell & Tanis

[57] ABSTRACT

An apparatus for heating liquids, in particular foodstuffs and luxury foodstuffs, for the purpose of pasteurizing, sterilizing and the like of the aforesaid foodstuffs. The apparatus consists of a rotor which is rotatable in a hollow sleeve part of a housing. An annular clearance space is provided between the internal surface of the hollow sleeve part and the exterior surface of the rotor. The liquid to be treated is fed into the clearance space at one end and discharged at a location spaced from the aforesaid one end of the rotor. The peripheral surface of the rotor on at least one end adjacent the location whereat the liquid is introduced into the clearance space is provided with a conveyor thread.

15 Claims, 6 Drawing Figures

APPARATUS FOR HEATING LIQUIDS, IN PARTICULAR FOODSTUFFS AND LUXURY FOODSTUFFS, FOR THE PURPOSE OF PASTEURIZATION, STERILIZATION AND THE LIKE

FIELD OF THE INVENTION

The invention relates to an apparatus for the heating of liquids, in particular foodstuffs and luxury foodstuffs, for the purpose of pasteurization, sterilization and the like, comprising a rotor, which is rotatable in a hollow sleeve part of a housing and which forms with the housing an annular clearance space, to which is fed the liquid to be treated in the region of the two ends of the sleeve, wherein the liquid which is heated up by friction is discharged in the center region of the housing.

BACKGROUND OF THE INVENTION

German AS No. 1 667 933 illustrates an apparatus of this type for treating milk or milk products, comprising a clearance space between a stationary housing and a disk rotating therein to guide therethrough the liquid to be treated and openings near the axis of rotation of the disk for introducing the liquid into the clearance space. The liquid is thereby conveyed by a separately arranged pump, for example a centrifugal pump into and through the apparatus. Thus altogether two drives are needed, namely, one for the disk and the other one for the centrifugal pump.

The purpose of this invention is to provide a better control or adjusting possibility of the duration and duration distribution of the food which is to be pasteurized, sterilized or heated, the capability of adjusting the construction to highly and low viscous fluids and the possibility of changing by a suitable selection of the clearance width, speed of the rotor, etc. the flow condition in the clearance space.

While one must expect below the so-called critical Taylor number a purely laminar shear flow, upon further increase of the speed said type of flow becomes unstable and the so-called Taylor vortices are created, which cause a secondary flow, which as is desired, substantially prevents in particular during a sterilization operation a baking on of the liquid. Upon further increase of the speed a turbulence is created. This too is for many purposes of use a desired flow condition, since through this the apparent viscosity and thus the temperature increase due to the inner friction is increased.

A further purpose of the invention exists in improving the conventional apparatus so that only one single drive is needed for both the conveying member and also for the member which effects the temperature increase of the liquid to be treated.

SUMMARY OF THE INVENTION

This purpose is inventively attained by the rotor having the form of an elongated roller having two end parts and a center part, wherein the peripheral surfaces at least of the two end parts are provided with a conveyor thread. The two end parts of the rotor act thereby first as thread pumps, while the center part of the rotor is suited and designated exclusively for effecting a heating up of the liquid to be treated. This has the advantage that only one single drive both for the two thread pumps and also for the center part of the rotor is needed. Moreover, the two thread pumps fulfill altogether two functions: On the one hand they are conveying and pressure-increasing members and on the other hand they contribute to a certain degree also to the increase of the temperature of the liquid due to preheating.

A further advantage of the inventive apparatus compared with the state of the art is a self-cleaning feature, which effects an increase of the duration of the operating time compared with the standstill times caused by necessary cleaning processes. With the double arrangement, sealing problems do not occur at the place of the discharge, where the highest pressure and the highest temperature exist.

In spite of these advantages of a two-fluted system, one-fluted systems are of course also possible.

The inventive apparatus is also suitable for effecting a heating up of highly viscous materials; the heating of liquids which occurs according to the common methods is rather difficult since it is impossible to avoid the laminar condition and since due to the poor heat conductivity of said materials only an insufficient heat transfer with the consequence of uneven, namely, not uniform and thus unsatisfactory heating up is achieved.

According to a further characteristic of the invention, the conveyor thread on the two end parts of the rotor is constructed as a V-thread.

According to a further embodiment of the inventive apparatus, the peripheral surface of the center part of the rotor is also provided with a thread.

The thread of the center part is preferably constructed as a square thread.

The annular clearances at the two ends of the center part of the rotor are connected to one another through at least one pressure-balancing pipeline.

A groove is provided preferably in the center region of the cylindrical sleeve part of the housing, into which groove terminates the discharge pipeline for the treated liquid.

The groove is thereby constructed as a helical groove, wherein a wiping lip is provided on the discharge side of the same.

A centrifuge ring is arranged on the center part of the rotor, which ring engages the groove.

Throttle members, in particular throttle valves, are arranged in the two supply pipelines and the discharge pipeline for the treated liquid, with the help of which the duration of the liquid to be treated in the apparatus can be changed. By changing the duration time, it is also possible to change the temperature corresponding with the liquid. On the other hand, it is also possible to adjust the duration time over wide limits independently from the temperature increase. Further adjusting possibilities are available, namely, changing the speed of the rotor, changing the volume per unit of time, changing the clearance width and the possibility of changing the clearance width during the operation through temperature action onto the housing of the apparatus. All these adjusting parameters are closely connected to the dynamic strength of the fluid to be warmed or heated up and its above-described flow condition.

BRIEF DESCRIPTION OF THE DRAWINGS

Some exemplary embodiments of the apparatus for heating of liquids according to the invention are described below with reference to the drawings, in which.

DETAILED DESCRIPTION

Figure 1:
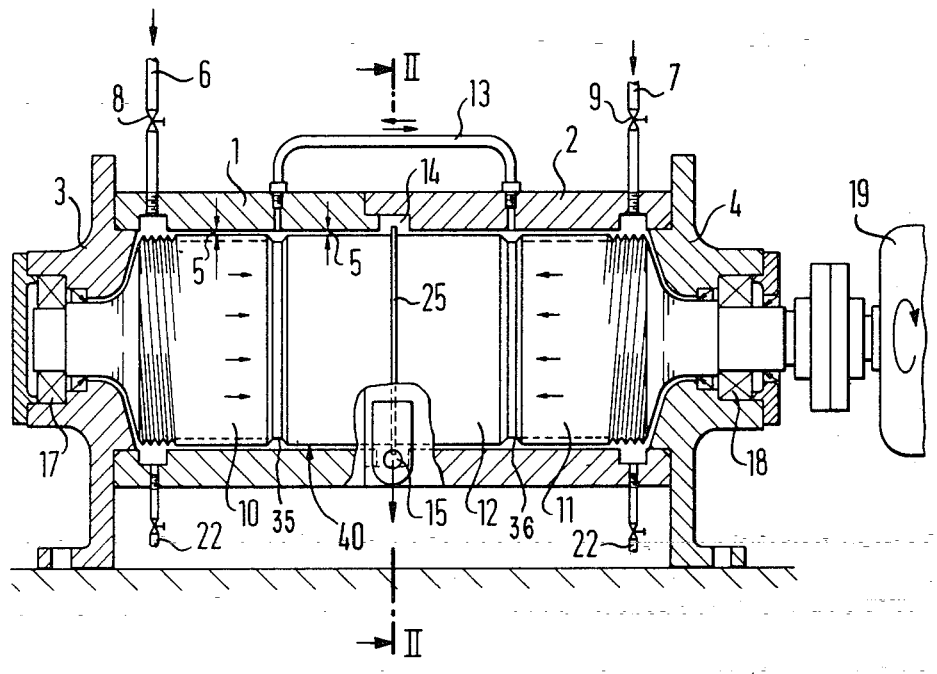
FIG. 1 is a partially sectioned view of a first embodiment of the apparatus embodying the invention.

The apparatus for heating of liquids, in particular foodstuffs and luxury foodstuffs for the purpose of pasteurization, sterilization and the like has a pair of axially aligned, cylinder-shaped sleeves 1,2 forming a housing. It is to be recognized that a single piece sleeve can be utilized, if desired. It is, however, preferable to use the two-piece sleeve.

End cap members 3,4 are provided on the two opposite ends of the cylinder-shaped sleeves 1,2, which end cap members together with the sleeves 1,2 define a chamber, in which a rotor 40 is rotatably supported. The rotor 40 has the form of a cylindrical roller and forms together with the interior of the cylinder-shaped sleeve 1,2 of the housing an annular clearance space 5. The liquid which is to be treated is supplied to the annular clearance space at the two ends of the sleeve 1,2 through the two supply pipelines 6,7. Throttle members in the form of throttle valves 8,9 are arranged in the two supply pipelines 6,7.

The rotor 40 has in the embodiment illustrated in FIG. 1 the shape of a roller having two end parts 10,11 and a center part 12, wherein the peripheral surfaces of the two end parts 10,11 are each provided with a conveyor thread. The conveyor thread on each of the two end parts 10,11 of the rotor is preferably constructed as a V-thread. However, the invention is by no means limited to this special design. The peripheral surface of the center part 12 of the rotor is constructed smoothly in the embodiment according to FIG. 1.

The two opposite ends of the center part 12 of the rotor 40 are defined by annular grooves 35 and 36 in the rotor. The region adjacent each of the grooves 35 and 36 is connected by at least one pressure-balancing pipeline 13.

In the center region of the interior of the cylinder-shaped sleeve 1,2 of the housing of the apparatus there is provided a groove 14, which in the embodiment according to FIG. 1 is constructed as an annular groove. The discharge pipeline 15 which is designated for the liquid to be treated terminates in the groove 14, in which pipeline 15 there is provided a throttle member in the form of a throttle valve 16.

The rotor 40 is rotatably supported through the provision of suitable pins secured to its two ends and which are received in bearings 17,18. The rotary movement of the rotor is transmitted thereto by a drive motor 19 operatively coupled to one of the pins.

Figure 2:
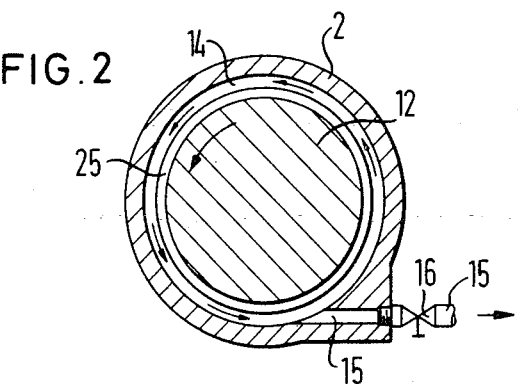
FIG. 2 is a vertical cross section taken along the line II—II of FIG. 1.
Figure 3:
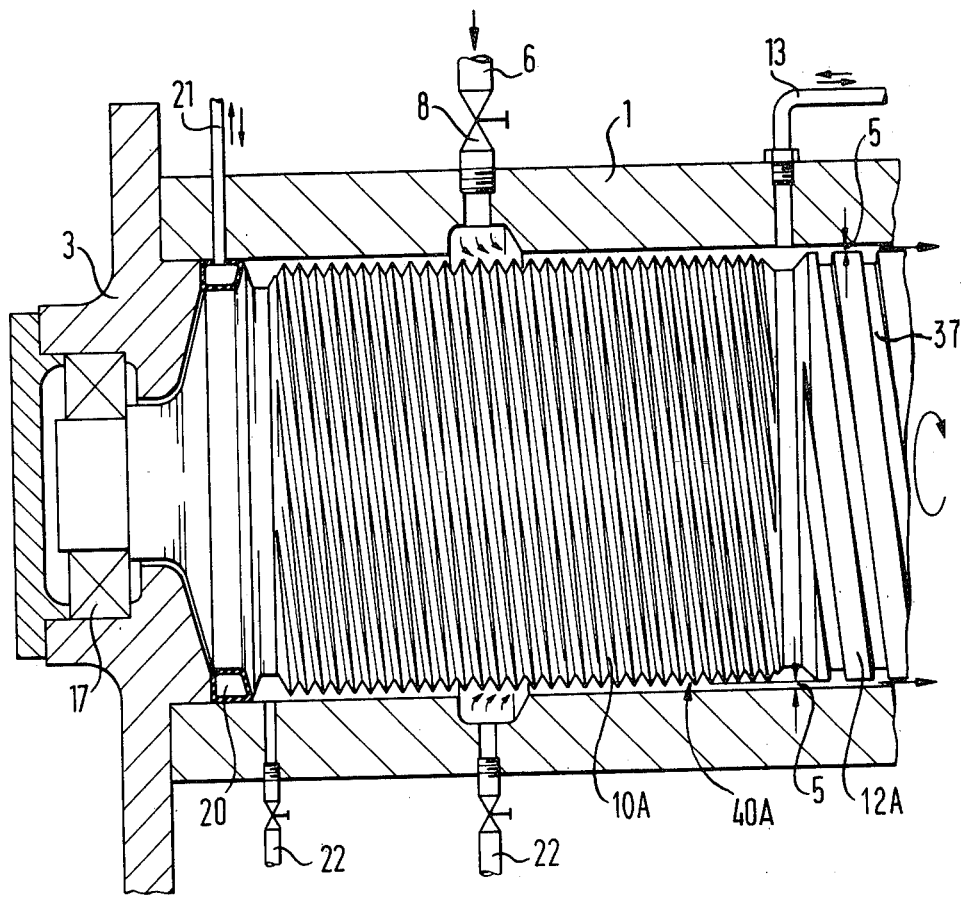
FIG. 3 is a partial cross section is an enlarged scale of a further embodiment of the apparatus embodying the invention.

A modified embodiment of a rotor 40A according to FIG. 3 differs from the embodiment of FIGS. 1 and 2 substantially by providing the peripheral surface of the center part 12A with a thread 37 of rectangular cross-section, namely, a flat thread. This construction is preferable for the treatment of highly viscous fluids. The center part 12A of the rotor which is provided with a flat thread represents, compared with a V-thread, a pump with a very poor efficiency and, therefore, a high production of heat.

An inflatable gasket is identified by the reference numeral 20, which gasket is constructed as a hollow ring which can be evacuated through the pipeline 21. The gasket 20 fulfills its function only during the standstill condition or during starting of the rotation of the rotor. Upon the rotor attaining a certain speed, the gasket 20 is evacuated through the line 21, so that the gasket lifts off from the rotor, and the conveyor thread which is extended through inlet annular grooves takes over the sealing function through a suction effect.

Cleaning pipelines are identified by the reference numeral 22, by means of which pipelines cleaning fluids can be introduced into the housing.

Figure 4:
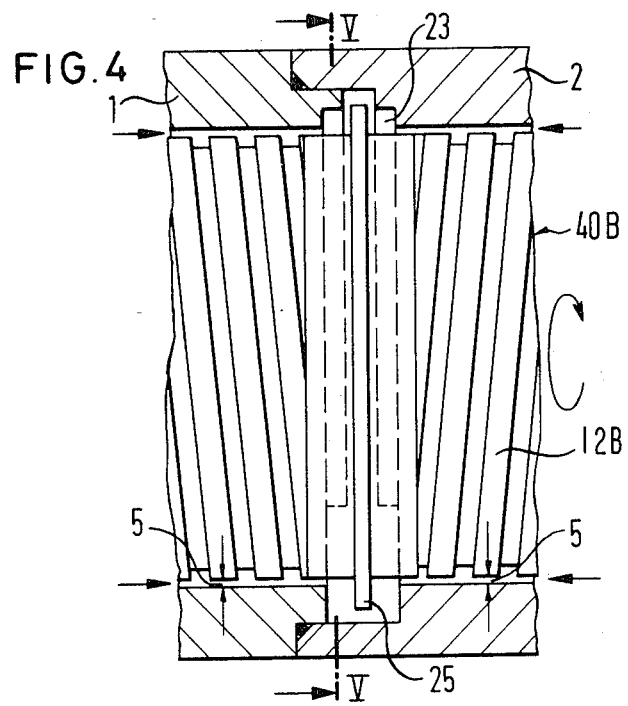
FIG. 4 is a partial vertical cross section of a further embodiment of the apparatus embodying the invention.
Figure 5:
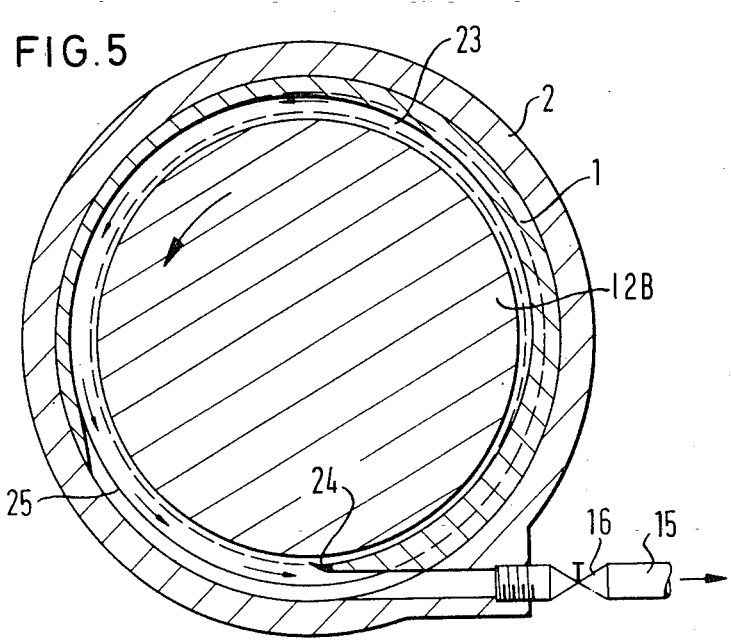
FIG. 5 is a vertical cross section taken along the line V—V of FIG. 4.

In the illustration according to FIGS. 4 and 5, the annular groove 23 in the interior of the sleeve 1,2 has a spiral shape, wherein a wiping lip or blade 24 is provided on the outlet side thereof, a solution, which appears preferable in certain cases.

A centrifuge ring 25 is arranged on the center part 12B of the rotor 40B, which ring 25 is received in the groove 23. The centrifuge ring 25 is of importance for stability purposes during operation of the apparatus.

Figure 6:
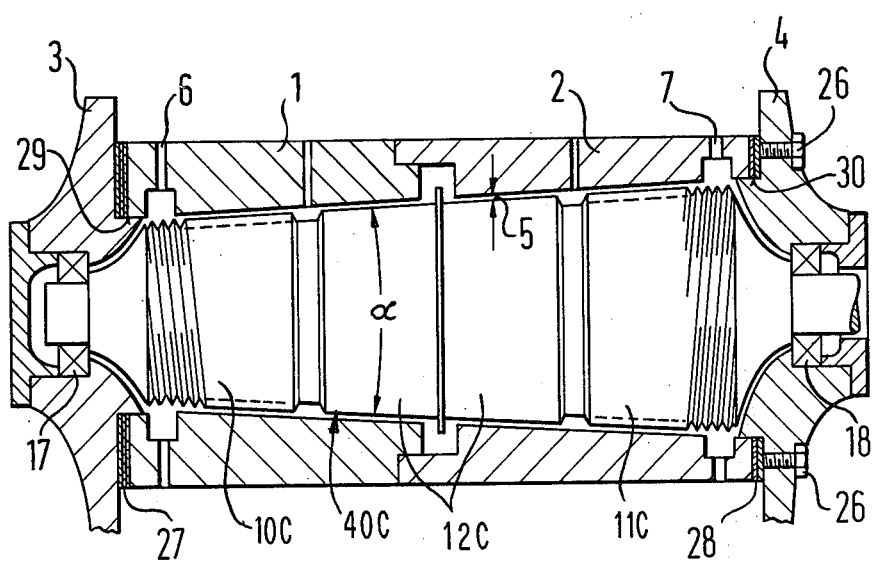
FIG. 6 is a cross section of a fourth embodiment of an apparatus according to the invention.

A further exemplary embodiment of the apparatus is illustrated in FIG. 6, wherein again the same reference numerals are used for the same parts as were used in the preceding figures except for the rotor which is identified by the reference numeral 40C. In the case of the sleeve which is constructed of two sleeve parts 1 and 2, the inner walls of the sleeves are inclined to define a conelike internal surface adapted to receive a frustrum-shaped rotor which consists of the end parts 10 and 11 and the center part 12; the angle $\alpha$ between the center line of the apparatus and the inclined inner walls of the sleeve amounts to a few degrees, for example 3°. The outer walls of the frustrum-shaped rotor extend parallel to the innner walls of the sleeve so that a uniform annular clearance space 5 is provided. The rotor is centrally supported at both ends in bearings 17 and 18 and in the end cap members 3 or 4 of the sleeve. Between the end cap member 3 and the sleeve part 1 and the end cap member 4 and the sleeve part 2 there are inserted several thin two-part spacer rings 27 and 28. The spacer rings 27,28 are composed of two semicircular sheet-metal plates. The spacers and the outer ends of the sleeve parts 1 and 2 are arranged on shoulders 29 or 30 of the end cap members 3 or 4; a gasket which is here not illustrated can be provided between the sleeve parts and the shoulders.

The width of the annular clearance space 5 between the rotor and inner surface of the sleeve can be adjusted with the described arrangement in that by an alternate removing and adding of spacer rings 27 and 28, the sleeve 1,2 is moved in axial direction relative to the rotor 40C. This movement can, for example, also be done by providing fastening screws 26 generally located in the end cap member 4, which fastening screws are threadedly secured into the sleeve part 2. By rotating the screws, it is possible to move the sleeve 1,2 also in longitudinal direction to enlarge or reduce the annular clearance space 5. In addition to this adjustment, it is also possible to use the spacer rings in the above-described manner.

The annular clearance space 5 can in this manner be varied in its dimension without having any diverse effects on the function capability of the inlet-outlet of pressure-compensating openings in the sleeve.

OPERATION

The operation of the apparatus according to the invention will be discussed in greater detail below with reference to FIG. 1 of the drawings.

The liquid, for example milk, which is to be treated, thus for example which is to be pasteurized or sterilized, is introduced into the annular clearance space 5 through the two pipelines 6 and 7. The two end parts 10,11 of the rotor 40 having the thread thereon, assure the transport of the liquid through the annular clearance space 5 in direction of the groove 14. During the transport of the liquid through the annular clearance space 5 which surrounds the two end parts 10,11 of the rotor, the liquid is partially heated up. Additional heat is supplied to the liquid during the transport through the annular clearance space 5 which surrounds the smooth surfaced center part 12. The liquid is heated up mostly by internal friction. A small portion of the heating up of the liquid in the stationary operating condition can be done by heat transfer from the machine parts which are at operating temperature to the yet colder fluid.

The heated liquid is then discharged through the discharge pipeline 15.

The duration in the annular clearance space 5 and the necessary temperature during the start of the apparatus are adjusted by suitably changing the parameters, for example the width annular clearance space, the heating up or cooling of the housing, changing the speed of rotation of the rotor and the volume of the liquid to be transported.

By supplying the liquid which is to be treated at the two ends of the cylindrical sleeve 1,2, the occurring axial forces are balanced so that axial thrust bearings are not needed.

It lies within the scope of the invention to arrange a milk homogenizer on the rotor. The apparatus can be used as a two-fluted system as described and shown in the figures as well as a one-fluted system.

In a one-fluted system the liquid which is to be treated is supplied to the annular clearance through only one supply pipeline at inlet 7 and is discharged after treatment via groove 14 through a discharge pipeline at outlet 15. The left center and end parts 12 and 10, respectively, of rotor 40 as shown in the figures as well as the left housing sleeve 1 are ommitted. End cap 3 is then directly connected to sleeve 2 and receives in its bearing 17 a shaft similar to that of the shown left end part 10, whereby the shaft is connected to the part 12 of rotor 40. Instead of two counter flows of liquid between two inlets and one outlet only one unidirectional flow of liquid between one inlet and an outlet is provided. All other features of the invention remain unchanged.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an apparatus for heating up liquids, in particular foodstuffs and luxury foodstuffs, for the purpose of pasteurization, sterilization and the like, including a housing having a hollow sleeve, a rotor which is rotatably supported in the hollow sleeve and is spaced by an annular clearance space from the interior surface of the hollow sleeve, means for feeding to the annular clearance space in the region of the two sleeve ends the liquid to be treated, and means for discharging the liquid, which is heated up by internal friction, from the center region of the housing, the improvement comprising wherein the rotor has the form of a roller having two end parts and a center part, and wherein the peripheral surfaces of at least the two end parts of the roller are each provided with a conveyor thread.

2. The apparatus according to claim 1, wherein the conveyor threads on the two end parts of the rotor are each constructed as a V-thread having a V-shaped cross section.

3. The apparatus according to claim 1, wherein the peripheral surface of the center part of the rotor is provided with a thread.

4. The apparatus according to claim 3, wherein the thread on the rotor center part is of rectangular cross section.

5. The apparatus according to claim 1, wherein the regions of the annular space adjacent the rotor at the two ends of the center part thereof are connected with one another through at least one pressure-balancing pipeline.

6. The apparatus according to claim 5, wherein the discharge means includes a pipeline, and wherein in the center area of the hollow sleeve of the housing there is provided a groove which communicates with the discharge pipeline for the treated liquid.

7. The apparatus according to claim 6, wherein the groove is a helical groove and a wiping lip is provided on the discharge side thereof.

8. The apparatus according to claim 5, including a centrifuge ring arranged on the center part of the rotor, which ring is disposed in the groove.

9. The apparatus according to claim 1, wherein the discharge means includes a discharge pipeline and the feed means includes two supply pipelines, and including throttle members which are provided in the two supply pipelines and in the discharge pipeline for the treated liquid.

10. The apparatus according to claim 1, including means for adjusting the liquid flow in the annular clearance space to an optimum with respect to the desired temperature increase in the liquid, including means for adjusting the width of the clearance space, the volume of liquid transported, and the speed of the rotor.

11. The apparatus according to claim 1, wherein the rotor is cylindrical and the inside of the sleeve conforms to this cylindrical shape to provide a uniform annular clearance space.

12. The apparatus according to claim 1, wherein the rotor has a conical frustrum-shaped outer contour and the inside of the sleeve conforms to said outer contour.

13. The apparatus according to claim 12 wherein the sleeve and the rotor are supported for longitudinal movement relative to one another in the direction of the conical frustrum axis to vary the width of the annular clearance space.

14. The apparatus according to claim 13, including means for effecting said movement of the sleeve relative to the rotor.

15. An apparatus for heating up liquid foodstuffs, comprising a housing having a hollow sleeve, a rotor which is rotatably supported in the hollow sleeve and is spaced by an annular clearance space from the interior surface of the hollow sleeve, to which annular clearance space is fed said liquid by a liquid inlet at one end of said rotor, said liquid being heated up by internal friction, and said liquid being discharged from said annular clearance space at a discharge location spaced from said one end of said rotor, said one end of said rotor adjacent said liquid inlet having a peripheral surface with a conveyor thread thereon to effect a conveyance of said liquid from said liquid inlet toward said discharge location spaced therefrom.

* * * * *

UNITED STATES PATENT AND TRADEMARK OFFICE
CERTIFICATE OF CORRECTION

PATENT NO. : 4 331 070
DATED : May 25, 1982
INVENTOR(S) : Viktor Denk

It is certified that error appears in the above—identified patent and that said Letters Patent is hereby corrected as shown below:

Col. 6, line 53; change "frustrum" to ---frustum---.

Col. 6, line 55; after "claim 12" insert a comma ---,---.

Col. 6, line 58; change "frustrum" to ---frustum---.

Signed and Sealed this

Third Day of August 1982

[SEAL]

Attest:

GERALD J. MOSSINGHOFF

Attesting Officer

Commissioner of Patents and Trademarks